United States Patent [19]

Heller et al.

[11] Patent Number: 5,548,637
[45] Date of Patent: Aug. 20, 1996

[54] METHOD AND APPARATUS FOR LOCATING PERSONNEL AND OBJECTS IN RESPONSE TO TELEPHONE INQUIRIES

[75] Inventors: Alan C. Heller; Brian M. Evins, both of San Antonio, Tex.; Robert G. Karp, Spring Valley, Ohio

[73] Assignee: Precision Tracking FM, Inc., Dallas, Tex.

[21] Appl. No.: 474,091

[22] Filed: Jun. 7, 1995

Related U.S. Application Data

[63] Continuation of Ser. No. 118,566, Sep. 9, 1993, abandoned.
[51] Int. Cl.$^6$ ..................................................... H04M 3/42
[52] U.S. Cl. ........................... 379/201; 379/211; 379/67; 379/210; 342/450; 250/338.1; 359/154
[58] Field of Search ............................. 379/104, 57, 201, 379/211, 210, 38, 39, 40, 41, 110, 59, 90, 102, 105, 58, 94, 357, 51, 157, 67; 455/608, 617, 600, 603, 605, 606, 607; 250/338.1–338.4, 353; 342/450; 359/154

[56] References Cited

U.S. PATENT DOCUMENTS

| | | | |
|---|---|---|---|
| 3,739,329 | 6/1973 | Lester | 379/104 |
| 4,275,385 | 6/1981 | White | 379/104 |
| 4,601,064 | 7/1986 | Shipley | 359/172 |
| 4,649,385 | 3/1987 | Aires et al. | 379/57 |
| 4,658,416 | 4/1987 | Tanaka | 379/211 |
| 4,750,197 | 6/1988 | Denekamp et al. | 379/58 |
| 4,901,084 | 2/1990 | Huguenin et al. | 342/179 |
| 4,932,050 | 6/1990 | Davidson et al. | 379/211 |
| 4,959,854 | 9/1990 | Cave et al. | 379/157 |
| 4,990,892 | 2/1991 | Guest et al. | 340/573 |
| 5,062,151 | 10/1991 | Shipley | 359/154 |
| 5,070,329 | 12/1991 | Jasinaki | 340/825.44 |
| 5,086,394 | 2/1992 | Shapira | 364/419.2 |
| 5,103,108 | 4/1992 | Crimmins | 250/338.1 |
| 5,119,104 | 6/1992 | Heller | 342/450 |
| 5,155,761 | 10/1992 | Hammond | 379/67 |

Primary Examiner—Jeffery Hofsass
Assistant Examiner—Scott Wolinsky
Attorney, Agent, or Firm—Pravel, Hewitt, Kimball & Krieger

[57] ABSTRACT

An automated position location system is provided which, in response to a telephone caller's inquiry and without human intervention, connects the caller directly to the telephone extension located nearest the individual or object of interest. A transmitter is attached to each individual (or object) to be monitored within a building. A number of stationary receivers are positioned at designated locations throughout the building. When a transmitter is transported within range of a receiver, information about the transmitter's identity and the receiver's location is provided to a tracking system, which calculates the transmitter's location and stores its identity and location in a chronological database. As the transmitter is transported throughout the building, the tracking system continually updates transmitter location information in the database. In response to a telephone caller's inquiry, an automated locating system determines the whereabouts of an individual person or object of interest and communicates a message to the caller which describes that location. Then, as requested by the caller, the locating system automatically places the call to the telephone extension nearest that location. Alternatively, the caller may request a list of those individuals and objects currently at a particular location.

6 Claims, 9 Drawing Sheets

METHOD AND APPARATUS FOR LOCATING PERSONNEL AND OBJECTS IN RESPONSE TO TELEPHONE INQUIRIES

This is a continuation of application Ser. No. 08/118,566, filed on Sep. 9, 1993, abandoned.

TECHNICAL FIELD OF THE INVENTION

This invention relates to position location systems, and more particularly, to a method and apparatus for locating personnel and objects in response to telephone inquiries.

BACKGROUND OF THE INVENTION

Position location systems are used to locate, and track the movement of, persons or objects within a building or similar enclosed facility. For example, in a large medical facility such as a hospital, a position location system may be used to determine the exact location of a critical care physician or nurse, or certain emergency equipment such as a "code blue" cart. Also, such a system may be used to track the movement of employees and inventory in a manufacturing facility, such as an automobile manufacturing plant or semiconductor integrated circuit fabrication plant. Typically, a small transmitter is attached to each object to be tracked. The transmitter radiates a unique, identification signal. A number of receivers are strategically positioned to detect the radiated signals in different areas throughout the facility. Consequently, the object of interest may be tracked throughout the facility by following the movement of the detected signals.

For example, U.S. Pat. No. 5,062,151 discloses a system for locating personnel at a large facility. A portable, infrared transmitter is attached to each person to be located. Each transmitter radiates a unique, coded signal. A plurality of fixed, infrared receivers are positioned to cover different areas of the facility. Each receiver is capable of sensing and storing any of the unique signals radiated by the transmitters. A microcomputer polls each fixed receiver and, in response to a request to locate a certain individual, visually displays the location of the receiver at which the individual was most recently seen. Each room in the facility has a telephone. Upon receiving a call for an individual, an operator enters the individual's name into the computer, which directs the call to the telephone nearest the individual. However, the use of an operator to receive and enter the incoming calls increases both the time needed to connect the calls and hence the overall expense of the locating system. Furthermore, this patent discloses no specific system or method for directing an incoming call to the individual of interest.

U.S. Pat. No. 5,155,761 discloses a system and method for answering incoming telephone calls. Outside telephone calls are coupled through a telephone control switch to a "robot" controller, which is in turn controlled by a central processing unit. The control switch includes an ACD/PBX switchboard with attendants or operators. The robot controller is connected to a host computer and other "resources" such as facsimile machines or communications modems. Incoming calls are allocated by the ACD/PBX system to available resources or attendants. In the event that the resources or attendants are unavailable, the robot controller advises the caller with a recorded message that the resources are busy, and provides a time when the call is expected to be returned. However, the use of attendants to place incoming calls directly to individuals increases the connect time and overall expense of the system.

Accordingly, a need exists for a position location system that automatically locates an individual or object in response to a telephone caller's inquiry, and also directs the call to the telephone nearest that individual or object.

SUMMARY OF THE INVENTION

The invention is an automated position location system which, in response to a telephone caller's inquiry and without human intervention, connects the caller directly to the telephone extension located nearest the individual or object of interest. In a preferred embodiment of the invention, an infrared transmitter is attached to each individual (or object) to be monitored within a building. Each transmitter radiates a unique, encoded identification signal. A number of stationary infrared sensors are positioned at designated locations throughout the building. When a transmitter is located within view of a sensor, the coded signal is detected by the sensor and coupled to a monitoring system, such as a computer processor. The monitoring system calculates the transmitter's location and stores its identity and location in a chronological database. As the transmitter is transported throughout the building, the monitoring system continually updates location information into the database. In response to a telephone caller's inquiry, a computer-based locating system determines the whereabouts of a person (or object) of interest and generates a message for the caller which describes that location. Then, if prompted by the caller, the locating system automatically places the call to the telephone extension nearest that location. Under certain circumstances, the locating system automatically forwards the call to an external telephone number, such as the number of an individual's beeper, cellular phone, or home telephone.

An important technical advantage of the invention is that no telephone operator or PBX switchboard attendant is needed to place a call directly to an individual, which decreases the connect time and overall expense of the system.

Another technical advantage of the invention is that personnel and equipment may be located when needed, thus providing more efficient use of critical services than conventional locating systems.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
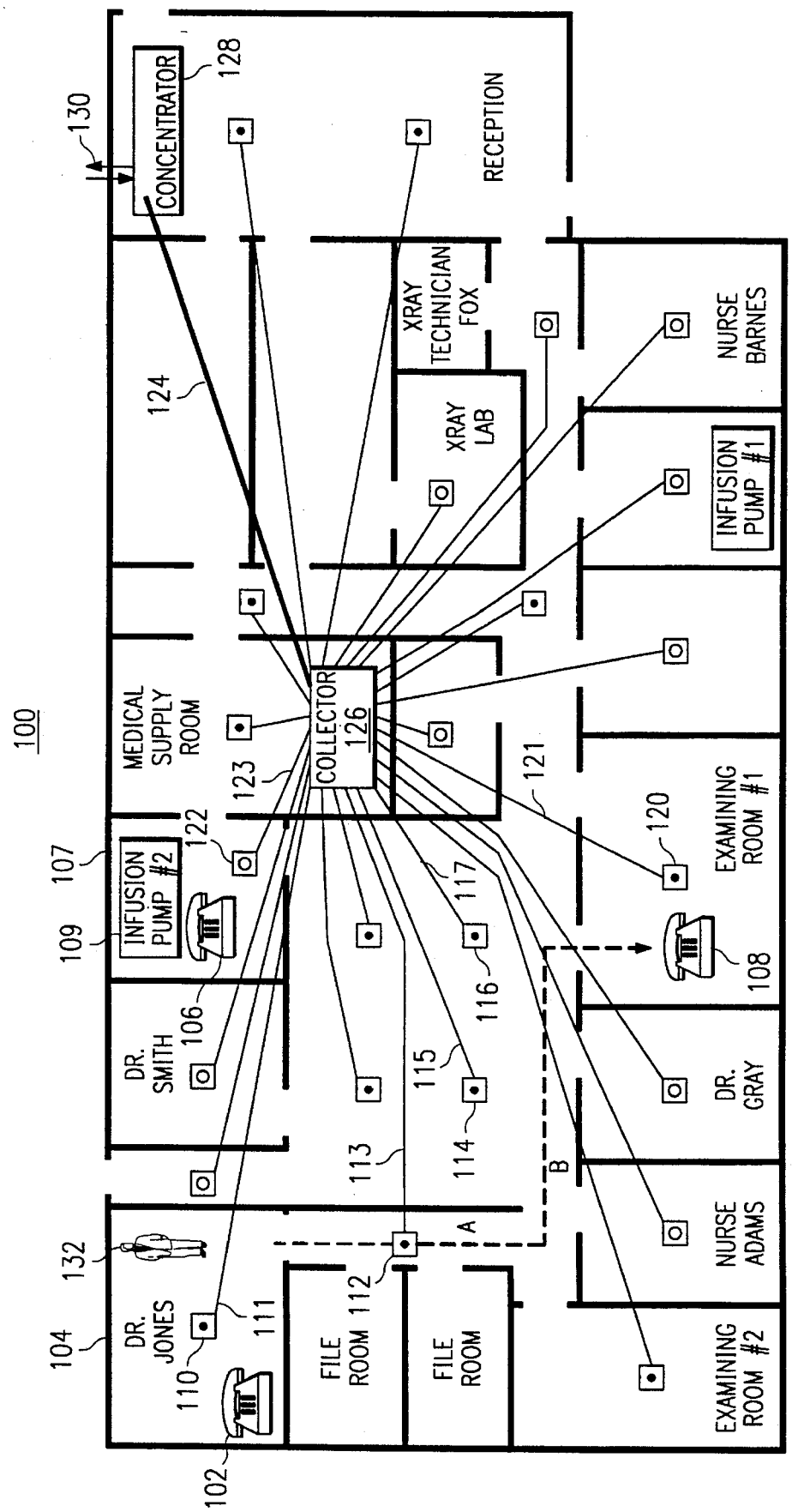
FIG. 1 illustrates the layout of a facility including a sensor network arranged in accordance with a preferred embodiment of the invention.

FIG. 1 illustrates the layout of a facility including a sensor network arranged in accordance with a preferred embodiment of the invention. Facility 100 may be defined as a confined area such as a building or portion of a building. For illustrative purposes only, facility 100 is shown as a medical facility such as a clinic, but is not intended to be so limited. For example, facility 100 could be a building containing a production line or supply warehouse, it being understood that position location systems may be used to locate both personnel and objects. In the exemplary medical facility shown in FIG. 1, a plurality of stationary, infrared sensors are positioned at predetermined locations throughout the building. However, although infrared or optical sensors are contemplated for the preferred embodiment, the present invention is not intended to be so limited. Alternatively, for example, radiowave transmitters and receivers or other sensing systems suitable for position location also may be used. Sensor 110 may be affixed to the ceiling of room 104, which is currently designated as the office of Dr. Jones. Also, telephone extension 102 may be located in Dr. Jones' office. Preferably, a telephone extension is located near each sensor. Sensor 110 is connected to collector box 126 by coaxial wire 111. For illustrative purposes, only selected sensors are described in detail, it being understood that a general description of the structure and operation of one sensor would apply equally to all sensors. Sensors 112, 114 and 116 are placed in hallways A and B, in order to track the movement of personnel and equipment between rooms in the leftmost area of building 100. Sensors 112, 114 and 116 are connected by respective coaxial wires 113, 115, and 117 to collector box 126. Sensor 120 is located in Examining Room #1 along with telephone extension 108, while sensor 122 is located in room 107 along with telephone extension 106. Sensors 120 and 122 are connected by respective coaxial wires 121 and 123 to collector box 126. Collector box 126 comprises an arrangement of signal amplifiers, which are used to enhance the signals from the respective sensors in a known manner. The signals from collector box 126 are coupled to concentrator box 128 by coaxial wire 124. Although not explicitly shown in FIG. 1, concentrator box 128 may be configured to receive sensor signals from a plurality of collector boxes. Using a conventional signal multiplexing scheme, concentrator box 128 couples all of the sensed signals to computer processor 200 through coaxial cable 130 which, for example, may be a standard RG-62 coaxial cable with associated connectors. Computer processor 200 is described in more detail below with respect to FIG. 2. Transmitter 132, which may be attached to Dr. Jones' clothing, radiates a uniquely coded infrared signal which identifies that particular transmitter and hence Dr. Jones. Essentially, as Dr. Jones moves from room 104 to Examining Room #1, the encoded signal from transmitter 132 is detected in sequence by respective sensors 110, 112, 114, 116 and 120. Alternatively, to illustrate locating a piece of critical equipment, transmitter 109 may be attached to transportable, infusion pump #2. The signal radiated from transmitter 109 is detected by sensor 122. The movement of infusion pump #2 may be tracked in a manner similar to that described above with respect to Dr. Jones' movement.

Figure 2:
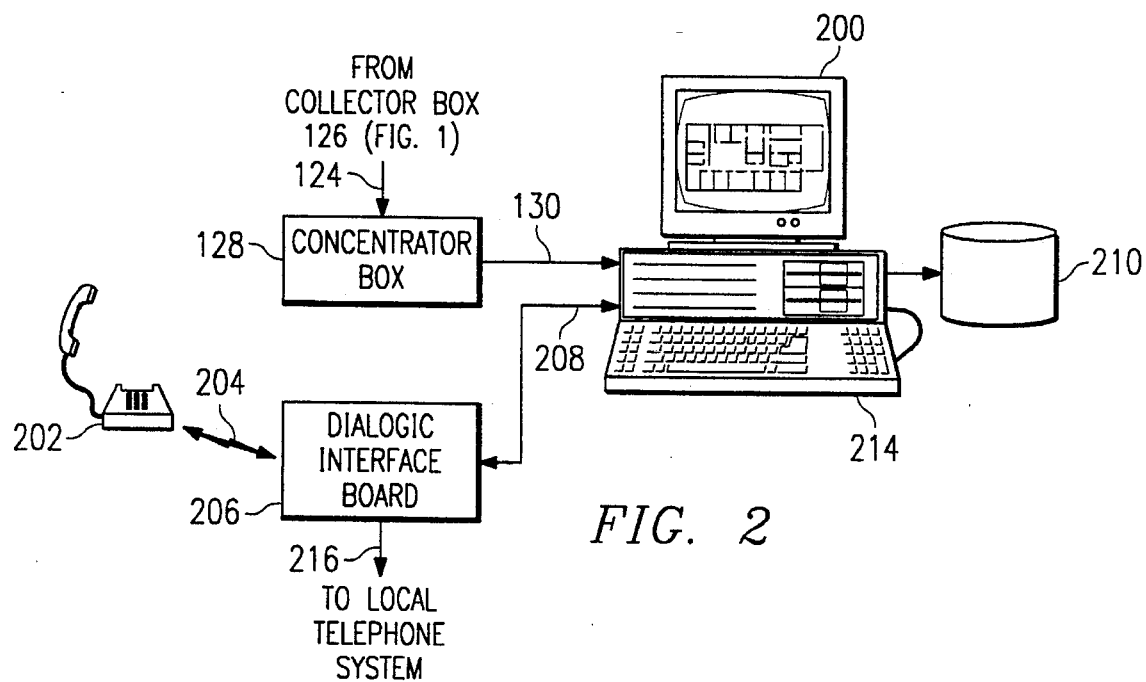
FIG. 2 illustrates a computer processing system that may be used to implement a preferred embodiment of the invention.

FIG. 2 illustrates a computer processing system that may be used to implement a preferred embodiment of the invention. Computer processor 200 may be, for example, a personal computer, or medium or general purpose computer having a conventional architecture. Typically, computer processor 200 may include a CPU with associated components such as RAM and ROM (not explicitly shown), hard drive 210 or some other known mass storage medium, keyboard 214, and an I/O interface section (not explicitly shown). The sensor data from concentrator box 128 is coupled via coaxial cable 130 to the I/O section of computer processor 200. Dialogic interface board 206 is connected by coaxial wire 208 to computer processor 200, thus providing a hardware interface between the software instructions operating in computer processor 200 and the internal and external telephone systems. Specifically, dialogic interface board 206 is connected by utility line 204 to external telephone 202, and by line 216 to the facility's internal telephone system. Under the control of computer processor 200, dialogic interface board 206 may be directed to answer or terminate incoming calls, connect incoming calls to internal telephone extensions, and transmit "voice" messages to both the external and internal telephones. Although dialogic interface board 206 may be used to perform certain collateral functions associated with the hardware implementation of the invention, knowledge of its specific structure and operation should not be needed to understand and use the invention. Also, the particulars of inputting, outputting, storing and retrieving data in computer processor 200 should be readily understood by those individuals skilled in the art of designing and programming computer systems.

Figure 3:
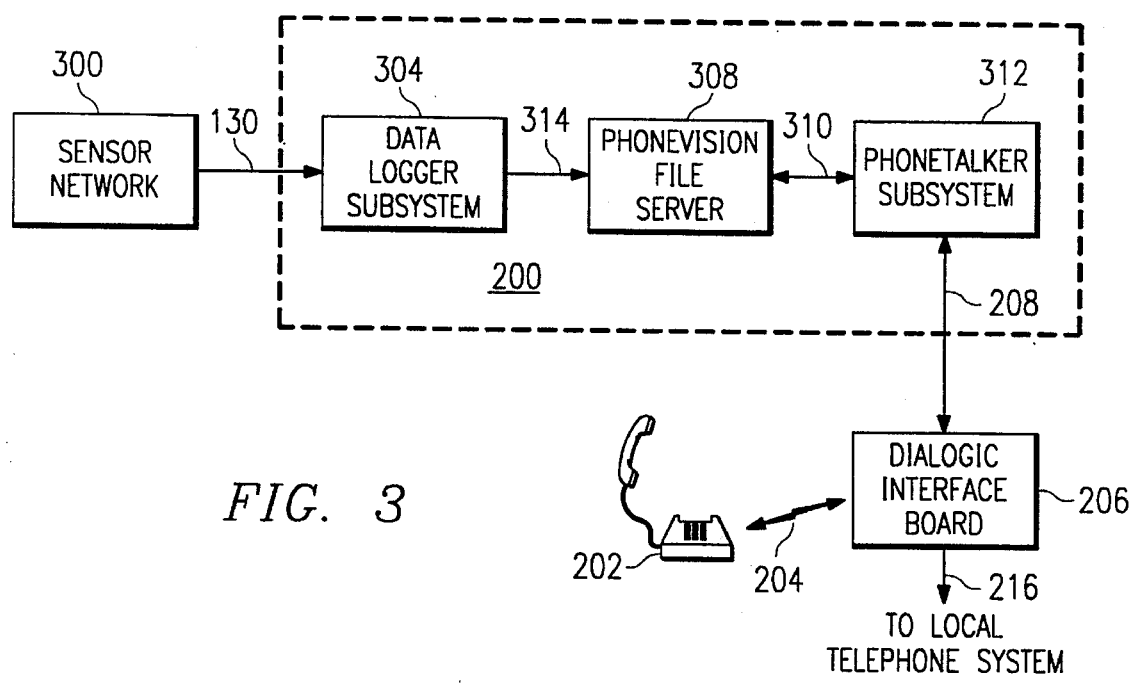
FIG. 3 is an overall functional block diagram of a position location system in accordance with a preferred embodiment of the invention.

FIG. 3 is an overall functional block diagram of a position location system in accordance with a preferred embodiment of the invention. Sensor network 300, which may include a plurality of sensors, collector boxes, and at least one concentrator box 128 (FIG. 2), couples the coded signals detected by the sensors to data logger subsystem 304. The Data Logger is a software-driven tracking program that resides in dedicated files on disk drive 210 and may be implemented by computer processor 200. Those particular files and the functions they perform are defined to comprise data logger subsystem 304. The Data Logger receives the data from sensor network 300, calculates the locations of individuals and objects in a manner to be described in more detail below, and writes the resulting data to dedicated files in a segment of disk drive 210. These particular files and the functions they perform are defined to comprise phonevision file server 308. The write "connection" between data logger subsystem 304 and phonevision file server 308 is shown, for illustrative purposes only, as line 314, it being understood that the hardware aspect of reading and writing data with a computer is well known. Also residing in phonevision file server 308 is the software-driven, Phonevision Database Program, which may be implemented by computer processor 200. The Phonevision program functions to create maps, asset definitions, sensor network configurations and zone definitions, and then writes the generated data to the database files in phonevision file server 308. More specifically, the data contained in phonevision file server 308 is oriented toward determining the location of an individual or object, which is called an "asset". The object to be tracked has the transmitter attached that radiates a signal including a unique identification number. This number is defined as the "Tag ID". The object itself is defined in an asset definition file called "asset.arg". The object's definition includes a unique number called the "Asset ID". Information about the object also may be stored in its asset definition file. One such piece of information is the "Asset Name". The Tag ID associated with that object also may be retained in the asset definition file. Consequently, given the Asset ID, the definition record in the asset.arg file may be accessed to retrieve the Asset Name or Tag ID associated with that object. Also, given the Asset Name, the asset definition file could provide the associated Asset ID and Tag ID, and so on if given the Tag ID, for example. The object's location may be determined from an Asset ID. The Asset ID is maintained in an asset positional history file called a "Tag" file. The records in the positional history files are sequential and chronological. Thus, the last record in a particular positional history file contains the last known position for that object. Position data are defined in terms of x, y and z coordinates. These coordinates may be compared with the coordinates defining a zone to determine if the object is positioned within that zone. Each zone definitional file provides a textual name for an asset's (object's) location. A map of the layout of a facility may be defined as a plurality of zones. Each zone comprises a rectangular area. Each zone definitional file defines its rectangular area in terms of coordinate origin and corner. Given x, y, z positional data from a history file, that data may be compared to all zone rectangles to determine which rectangles include the given x, y, z coordinate. Zones may overlap, or be nested, at a particular set of coordinates. Of the resulting rectangles, the one with the highest nest-level value or greatest amount of overlap is determined to be the locating zone. The name of the locating zone then may be used to describe the asset's location. To determine what assets are within a given zone, the zone rectangle data are retrieved from the zone's definition file. The x, y, z coordinates of each asset are then read from each Tag file. The coordinates of each asset are then compared to the zone rectangle data, thus identifying those assets within that particular zone. In other words, the identities of all monitored individuals and objects may be determined within a given room.

Referring again to FIG. 3, the sensor data is continually coupled to data logger subsystem 304. The Phonetalker is a software-driven program that resides in dedicated files on disk drive 210 and may be implemented by computer processor 200. Those particular files and the functions they perform are defined to comprise phonetalker subsystem 312. Using a method described below with respect to FIG. 4, phonetalker subsystem 312 may query phonevision file server 308, via line 310, to determine the location of an individual or object of interest. Typically, such an inquiry would be made in response to a request from a caller on telephone 202, via telephone line 204. Also, phonetalker subsystem 312 may direct dialogic interface 206 to connect the incoming call to the telephone extension located nearest that individual or object, via line 216. Two-way communications are performed between phonetalker subsystem 312 and dialogic interface board 206, via line 208. At this point, it should be understood that the connections between, and proximity of the functional blocks shown in FIG. 3 are provided to illustrate the flow of control and information data only, but the invention is not intended to be so limited. For example, the data logger subsystem, or any other functional subsystem, may reside and operate in a computer processing system that is physically separated from computer processor 200. Consequently, line 314 may represent a communications path in a LAN or similar telecommunications network.

In order to communicate information to an incoming caller, phonetalker 312 retrieves certain voice messages from its directory of files located in disk drive 210. These messages provide instructions for the caller to request asset and zone location information by pressing certain keys on the telephone's keypad. The messages may also provide location information to the caller. The keyed-in requests from the caller may be in the form of DTMF character tones, which are received and stored in data files defined as DTMF input files that reside in phonetalker subsystem 312.

Figure 4A:
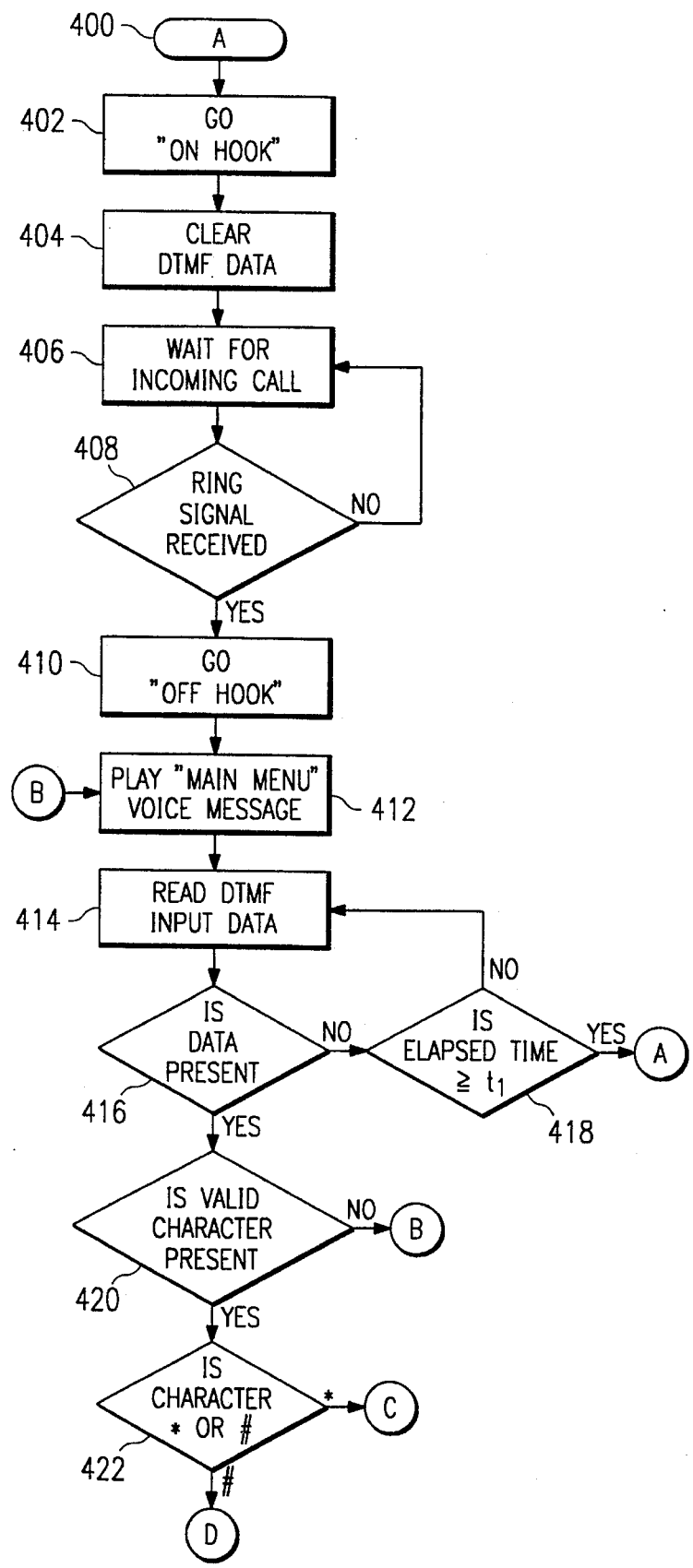
FIGS. 4(a)–(g) illustrate an overall sequence of steps which may be performed to implement a preferred embodiment of the invention.

FIGS. 4(a)–(g) illustrate an overall sequence of steps which may be performed to implement a preferred embodiment of the invention. Referring to FIGS. 3 and 4(a), the sequence begins initially at step 400. Phonetalker subsystem 312 then directs dialogic interface board 206 to "hang up" or go to an "on hook" state in step 402, the DTMF input data file is cleared of keypad tone data in step 404, and dialogic interface board is then directed to wait for an incoming call in step 406. At step 408, if no ring signal is received by dialogic interface board 206, the sequence proceeds back to step 406 and then continues within the loop shown until an incoming call is received. Otherwise, if at step 408 a ring signal is received, this event is communicated to phonetalker subsystem 312, which directs dialogic interface board 206 to answer the call or "go off hook" at step 410. At step 412, phonetalker subsystem 312 directs dialogic interface board 206 to play a voice message consisting of a menu of options to be selected from by the incoming caller, which are described in more detail below. This main menu message is intended to prompt the incoming caller to key-in (using the telephone's touchtone keypad) certain DTMF characters which, if any, are received by dialogic interface 206 and read by phonetalker subsystem 312 at step 414. If the incoming caller does not input a character at step 416, then the sequence proceeds to step 418. At step 418, if the elapsed time since the call was originated becomes greater than or equal to predetermined time t1 (e.g., 30 seconds), then the sequence proceeds back to step 400, where dialogic interface board 206 is directed to hang up (go "on hook") and wait for another call. However, if any data is present in the input DTMF file, then the sequence proceeds to step 420, where phonetalker subsystem 312 makes a determination about whether or not the data includes a DTMF character. If no valid DTMF character is present in the input file, then the sequence proceeds back to step 412, where phonetalker subsystem 312 again directs dialogic interface board 206 to prompt the caller to respond. Conversely, if a valid DTMF character is present at step 420, then the sequence proceeds to step 422, whereby phonetalker subsystem 312 determines if either the character "*" or "#" is present in the DTMF input file. If the character "*" is present, then the sequence proceeds to step 424 in FIG. 4(b). Otherwise, if the character in the input file is a "#", then the sequence proceeds to step 446 in FIG. 4(c). The character "*" may be defined to mean that the caller is requesting asset information (e.g., location of an individual or object), while the character "#" may mean that the caller is requesting zone information (e.g., a list of individuals and objects within a particular room).

Figure 4B:
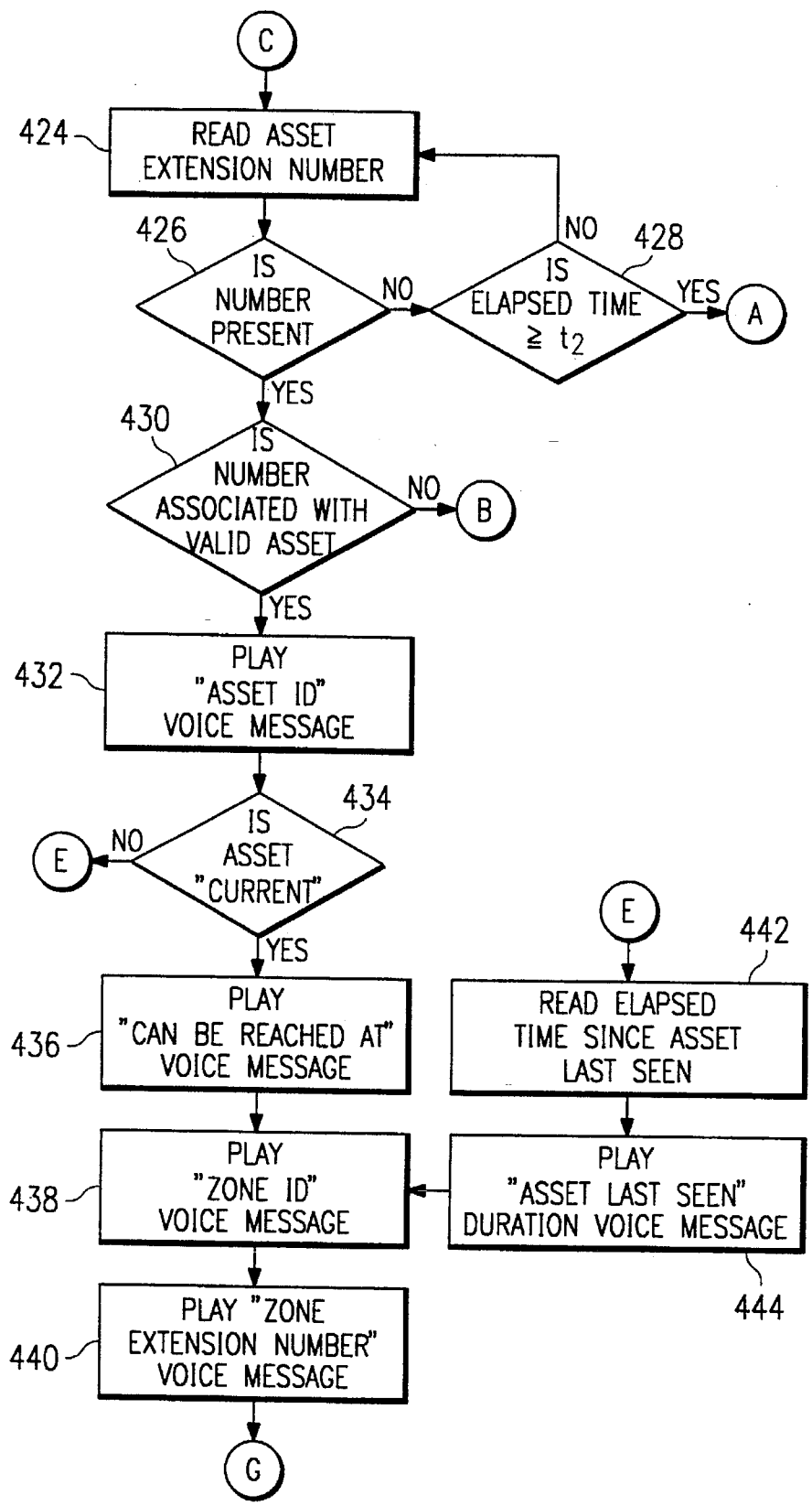
Figure 4C:
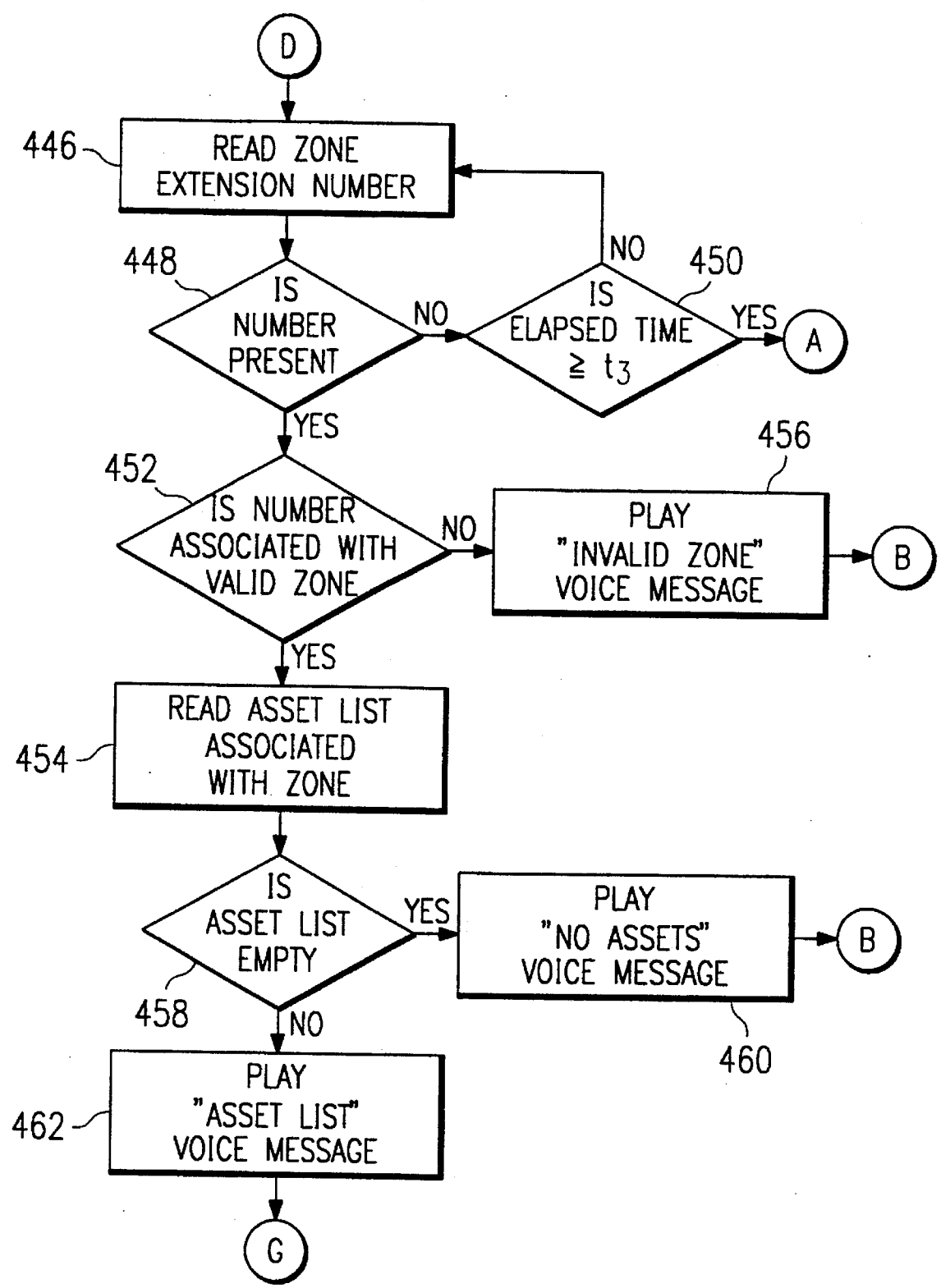

Referring to FIGS. 3 and 4(b), with the character "*" present in the DTMF input data file at step 424, phonetalker subsystem 312 reads the DTMF characters also input by the caller for a telephone extension number assigned to a person or object to be located. For example, to locate Dr. Jones in FIG. 1, a caller would press the telephone keys for extension number 102, which is assigned to Dr. Jones' office. To locate a particular piece of equipment, such as infusion pump number 2, the caller would input the characters for assigned extension number 106. Proceeding to step 426, phonetalker subsystem 312 determines if any number has been entered into the input file and, if not, the sequence proceeds to step 428. Then, if the elapsed time since the caller was prompted to input an extension number has become greater than or equal to predetermined time t2 (e.g., 15 seconds), then the sequence proceeds back to step 400 in FIG. 4(a) and dialogic interface board 208 is directed to hang up. Otherwise, the sequence proceeds back to step 424 and another attempt is made to read an asset's assigned extension number. Again at step 426, if any "number" characters are input by the caller, then at step 430 a determination is made by phonetalker subsystem 312 about whether or not the numbers are associated with a valid asset, such as Dr. Jones or infusion pump #2. If not, the sequence proceeds to step 412 in FIG. 4(*a*) and the caller is again prompted by a voice message to enter an appropriate extension number. However, if the number can be associated with a valid asset, then at step 432, phonetalker subsystem 312 directs dialogic interface board 206 to play a voice message to the caller that identifies the asset associated with the requested extension number, such as for example, "Dr. Jones" or "infusion pump number 2". At step 434, phonetalker subsystem 312 then determines if the asset of interest has been seen within a predetermined amount of time, or is "current". For example, has the asset been seen or "logged in" by data logger subsystem 304 within the last 10 minutes. If so, then phonetalker subsystem 312 directs dialogic interface board 206 to play the voice message "can be reached at" at step 436. Next, at step 438, phonetalker 312 reads the "Zone ID" from phonevision file server 308 that corresponds to the current location of the asset, and directs dialogic interface board 206 to play the voice message describing that location, such as, for example, "Dr. Jones' office" or "room 107" in the case of infusion pump #2. At step 440, phonetalker subsystem 312 then directs dialogic interface board 206 to play the voice message describing the telephone extension number assigned to the zone of interest (e.g., "extension number 102" or 106). However, if the asset has not been seen lately at step 434, then the sequence proceeds to step 442 whereby phonetalker subsystem 312 reads the elapsed time since the asset was last seen from phonevision file server 308, and directs dialogic interface board 206 to play the voice message "[asset] last seen [elapsed time]" at step 444. The sequence then proceeds to step 438 and continues as described above with respect to a "current" asset.

Returning to FIG. 4(*a*), if the character present at step 422 is a "#" sign, then the sequence proceeds to step 446 in FIG. 4(*c*). Referring to FIGS. 3 and 4(*c*), phonetalker subsystem 312 attempts to read the DTMF extension number requested by the incoming caller, at step 446. If a number is not present in the DTMF input file, then the sequence enters a loop comprising steps 450 and 446, either until a predetermined time t3 (e.g., 30 seconds) has elapsed or a number is input to the file. If no number is input during the time t3 at step 450, then the sequence proceeds to step 402 in FIG. 4(*a*), and dialogic interface board 206 is directed to hang up. Conversely, if a number is present at step 448, then phonetalker subsystem 312 determines whether or not the requested number is associated with a valid, defined zone. If not, then phonetalker subsystem 312 directs dialogic interface board 206 to play a voice message such as "the number [] is not a valid number" at step 456, and the sequence proceeds back to step 412 in FIG. 4(*a*) thus prompting the caller to start over. However, if at step 452, the number input by the caller is associated with a valid zone, then at step 454 phonetalker 312 reads the list of assets located in that zone from the Tag files in phonevision file server 308. If the asset list for that zone is empty, at step 458, then phonetalker subsystem 312 directs dialogic interface board 206 to play a voice message "there are no assets located in [zone]" at step 460 and the sequence returns to step 412 in FIG. 4(*a*). Otherwise, if assets are located in the zone of interest, then at step 462, phonetalker subsystem 312 directs dialogic interface board 206 to play a voice message listing each such asset. The sequence then proceeds to step 464 in FIG. 4(*d*).

Referring to FIGS. 2 and 4(*d*), at step 464, phonetalker subsystem 312 directs dialogic interface board 206 to play a voice message describing a "transfer menu". For example, the caller may be requested to input a zone's extension number, an operator's extension number, a local "phone mail" extension number, or select to return to the main menu of options. Alternatively, the caller may be prompted to input a number to be interpreted as a request to speak to anyone available, or anyone available in a certain "class" of individuals (e.g., any nurse or xray technician, etc.). At step 466, phonetalker subsystem 312 reads the keyed-in data from the DTMF input file. At step 468, phonetalker subsystem 312 then determines whether or not any character data is present in the input file and, if not, a loop is entered comprising steps 470 and 466, either until character data is keyed-in or predetermined time t4 (e.g., 30 seconds) has elapsed. If the elapsed time becomes greater than or equal to t4, then the sequence proceeds to step 402, and dialogic interface board 206 is directed to hang up. However, if a character is present in the DTMF input file, then phonetalker subsystem 312 proceeds to determine whether or not at least one of the characters "1", "2", "3", "4", "5" or "6" is present. At step 472, if the character "4" is present, it may represent that the caller desires to return to the main menu. Consequently, the sequence proceeds to step 412 in FIG. 4(*a*). Otherwise, at steps 474, 476, 478, 479, and 481, if any of characters "1", "2", "3", "5" or "6" are present in the input DTMF file, then the sequence proceeds to respective steps 482, 484 or 486 in FIG. 4(*e*), or steps 500 or 502 in FIG. 4(*f*). On the other hand, if none of the characters "1"–"6" are present in the input DTMF file, a loop is entered comprising steps 480, 466, and so on as shown, until either one of the characters "1"–"6" is keyed-in by the caller or predetermined time t5 (e.g., 40 seconds) has elapsed. If the elapsed time becomes greater than or equal to t5, then the sequence proceeds to step 402 in FIG. 4(*a*) and dialogic interface board 206 is directed to hang up.

Referring now to FIGS. 2 and 4(*e*), if the caller has selected one of the options represented by characters "1", "2" or "3", then dialogic interface board 206 is directed to dial the respective extension number of a zone of interest (step 482), the local operator or switchboard attendant (step 484), or the local "phone mail" extension number (step 486). Step 487 is an option to forward a call to an external number, such as, for example, a "home" telephone number, cellular phone number, answering service, beeper, etc., which may be selected automatically by computer processor 200 in response to a set of detected circumstances, which are described in detail with respect to FIG. 4(*g*). Next, at step 488, if the selected telephone extension "goes off hook" or is answered, then dialogic interface board 206 is directed to play the voice message "call for [asset name]" at step 490, thus making a successful connection. For that situation, dialogic interface board 206 is directed to hang up but still maintain the connection between telephone 202 and the selected telephone extension via line 216. That connection may then be maintained by the local system until the call is terminated by one of the speaking parties. However, at step 488, if no connection is made between the caller and the selected extension number, then phonetalker subsystem 312 queries dialogic interface board 206 to determine whether or not the called telephone extension is busy, at step 492. If so, the sequence proceeds to step 498 and dialogic interface board 206 is directed to play a voice message "extension number [] is busy" and the incoming caller is directed back to the main menu at step 412 in FIG. 4(*a*). At step 492, if the line is not busy, the sequence proceeds to step 494, whereby phonetalker subsystem 312 queries dialogic interface board 206 about whether or not the caller's equipment is properly configured to achieve a successful connection with the extension. If the caller's equipment is improperly configured, then dialogic interface board 206 is directed to play a voice message describing the configuration problem or "error" at step 496 Otherwise, the sequence proceeds to step 495, wherein a loop is entered comprising steps 495, 498, and so on. Thus, if the called extension is not busy, and the caller is properly configured, but no connection is made during predetermined elapsed time t6 (e.g., 45 seconds), then at step 499, dialogic interface board 206 is directed to play the voice message "there is no answer at extension number []". The caller is then directed back to the main menu at step 412 in FIG. 4(a).

Figure 4D:
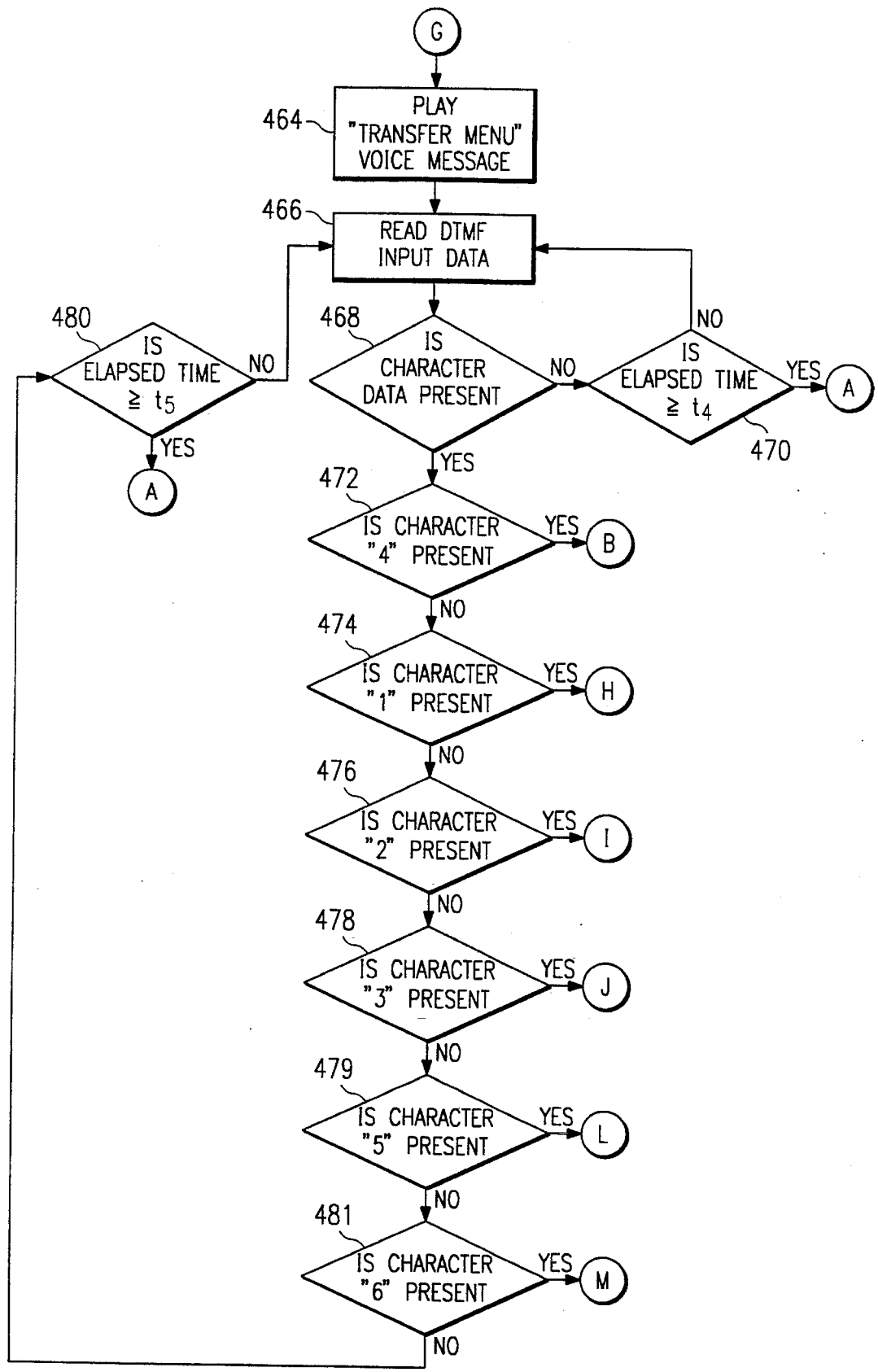
Figure 4E:
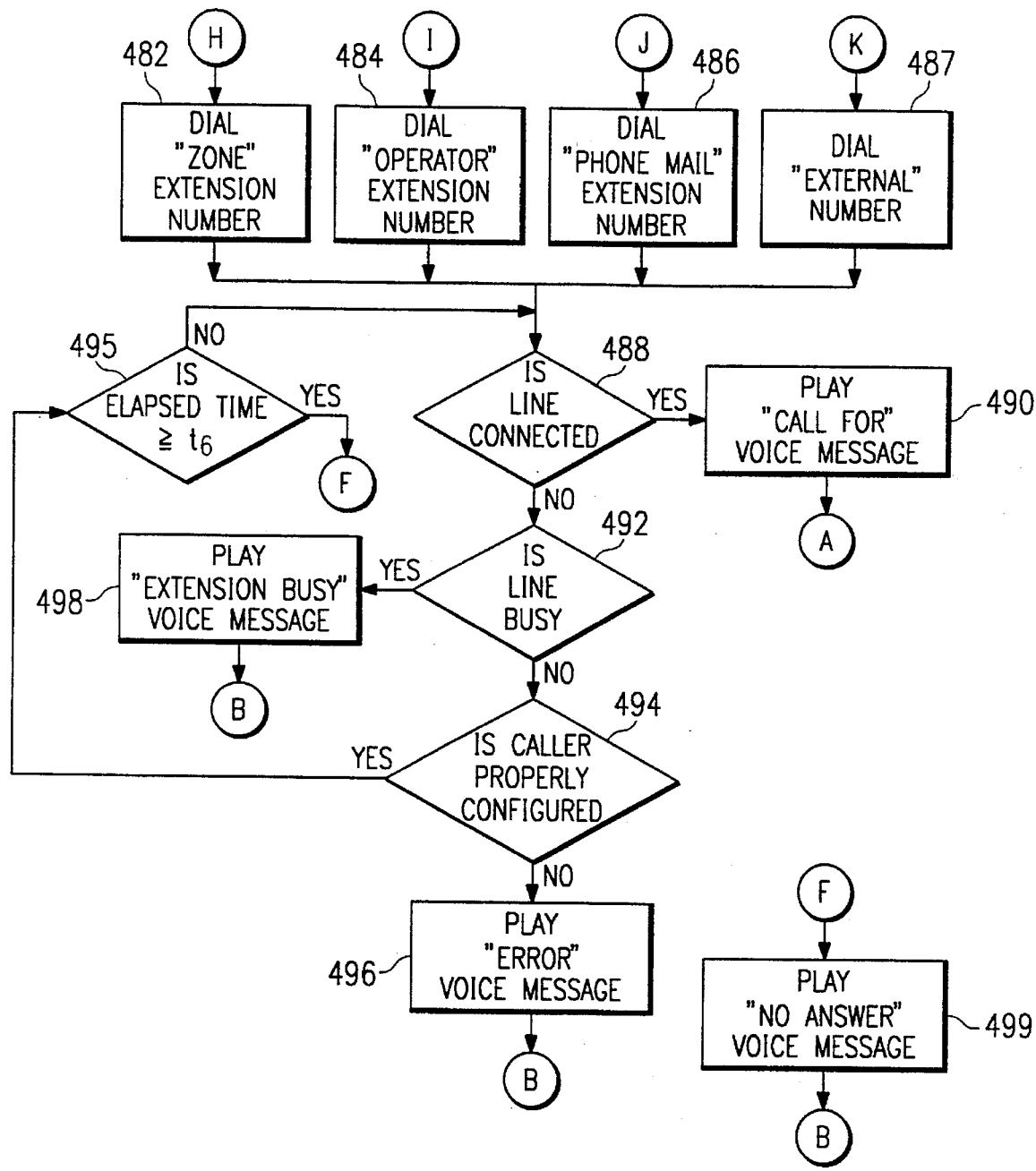
Figure 4F:
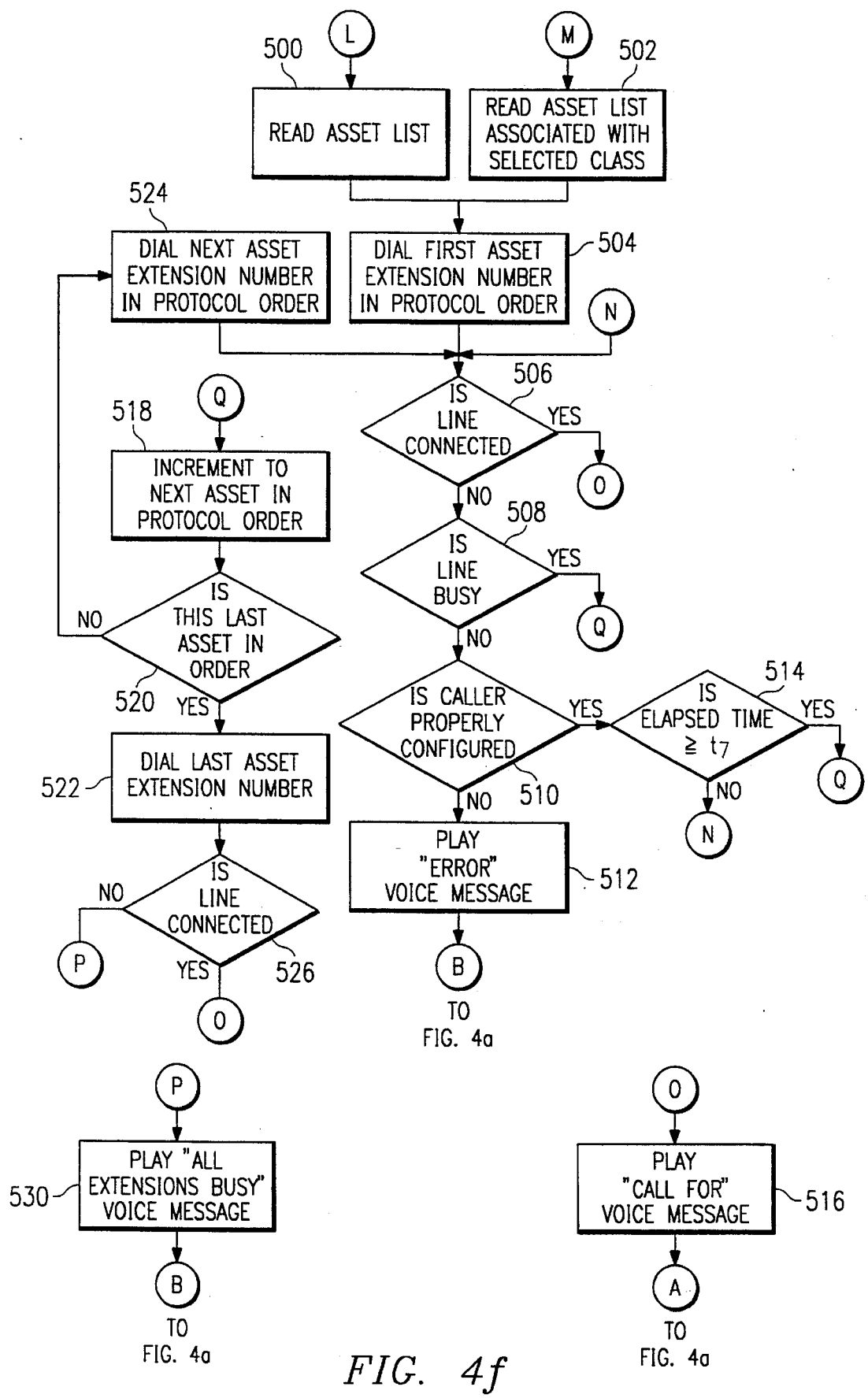

Referring now to FIGS. 2 and 4(f), if the caller (at step 479 in FIG. 4(d)) has selected the option represented by the character "5", at step 500, phonetalker subsystem 312 reads the asset list (excluding all inanimate assets) for the ultimate purpose of connecting the caller to any available individual. Alternatively, if the caller has selected the option represented by the character "6", at step 502, phonetalker subsystem 312 reads the asset list only from a selected class of individuals for the purpose of connecting the caller to any available individual in that class. For example, the caller may input the character "6" (to select the "class" option) followed by another character to select the particular "class". A selection of any available "nurse" may be represented by the character set "6" followed by a "1" while a request to speak to any available "xray technician" may be represented by the character "6" followed by a "2". These particular character sets are shown for illustrative purposes only and are not intended to limit the present invention. Next, at step 504, dialogic interface board 206 is directed to dial the extension number associated with the first asset read in either at step 500 or step 502. In a manner not explicitly shown, the asset list read in at either step 500 or 502 may first be sorted in accordance with a predetermined protocol to set up a particular order for individuals to be called, or on the other hand, the individuals may be listed in no particular order. Next, at step 506, if the selected telephone extension "goes off hook" or is answered, then dialogic interface board 206 is directed to play the voice message "call for [asset name]" at step 516, thus making a successful connection. For that situation, dialogic interface board 206 is directed to hang up but still maintain the connection between telephone 202 and the selected telephone extension via line 216. That connection may then be maintained by the local system until the call is terminated by one of the speaking parties. However, at step 506, if no connection is made between the caller and the selected extension number, then phonetalker subsystem 312 queries dialogic interface board 206 to determine whether or not the called telephone extension is busy, at step 508. If so, the sequence proceeds to step 518 where the next asset in the list is retrieved by phonetalker 312. At step 520, phonetalker 312 determines whether or not the retrieved asset is the last asset in the list of assets. If not, then dialogic interface board 206 is directed to dial the extension number of the retrieved asset, at step 524. The sequence again returns to step 506. At step 520, if the retrieved asset is the last asset in the list of assets, the sequence proceeds to step 522, whereby dialogic interface board 206 is directed to dial the extension number of that asset. At step 526, if the dialed extension is answered, then the sequence proceeds to step 516. However, at step 526, if no connection is made, then the sequence proceeds to step 530, whereby dialogic interface board 206 is directed to play the voice message "all extensions are busy" and the caller is returned to the "main menu" at step 412 in FIG. 4(a). Returning to step 508, if dialogic interface board 206 determines that the called extension is not busy, the sequence proceeds to step 510, whereby phonetalker subsystem 312 queries dialogic interface board 206 about whether or not the caller's equipment is properly configured to achieve a successful connection with the extension. If the caller's equipment is improperly configured, then dialogic interface board 206 is directed to play a voice message describing the configuration problem or "error" at step 512. Otherwise, the sequence proceeds to step 514, wherein one of two loops is entered, comprising either steps 514, 506, and so on, or steps 514, 518, and so on. Thus, if the called extension is not busy, and the caller is properly configured, but no connection is made during elapsed time t7 (e.g., 20 seconds), then the next asset on the list is dialed.

Figure 4G:
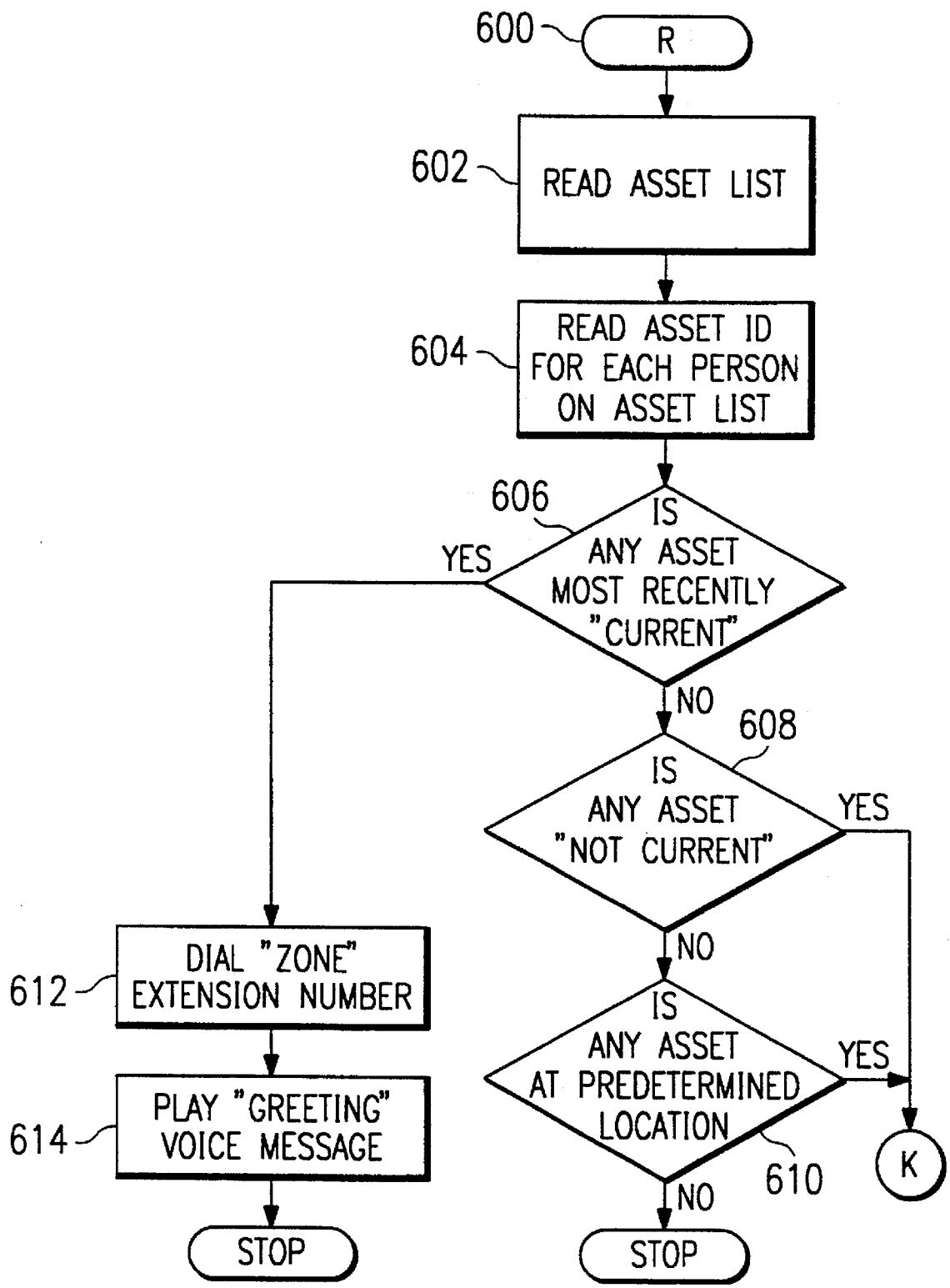

Referring now to FIGS. 2 and 4(g), as mentioned above, another aspect of the present invention provides the option of calling an external telephone number, such as a cellular phone or home telephone, etc., under certain circumstances. The sequence for this option is initialized at step 600 and may be called up periodically by the system. At step 602, phonetalker subsystem 312 reads the asset list and then reads the asset ID for each individual on the asset list, at step 604. Then, at step 606, phonetalker subsystem 312 determines if any asset on the list has been recently deemed "current". For example, did Dr. Jones recently enter room 104 (Dr. Jones' assigned office) with an assigned transmitter for the first time that day? If so, then the sequence proceeds to step 612, whereby dialogic interface board 206 is directed to dial the recently "current" asset's extension number and play a "greeting" voice message at step 614. Such an option may be used, for example, to confirm for the individual designated as the asset that the system has recognized the transmitter, as a form of system validation. Otherwise, the sequence proceeds to step 608, whereby phonetalker subsystem 312 determines whether or not an asset on the list has been recently deemed "not current". For example, did Dr. Jones recently leave the building with the assigned transmitter, or has the transmitter remained immobile for a predetermined period (e.g., been detached from Dr. Jones' clothing)? If so, then the sequence proceeds to step 487 in FIG. 4(e), whereby dialogic interface board 206 is directed to dial a predetermined telephone number. So, if Dr. Jones is no longer in the building, or most likely has left the building, then the call may be forwarded to her home or other external number. As yet another option, if at step 608, no asset has been deemed "not current" during that cycle, then the asset ID's may be checked to determine if any transmitter has been sensed at a predetermined location. For example, the system supervisor may require that individuals leaving the building place their assigned tags (transmitters) in a particular receptacle that includes a sensor. So, if Dr. Jones were to leave the building, then incoming calls could be forwarded to her office or home, etc. So, if at step 610, an asset (transmitter) is determined to be located in the above-described receptacle, then the sequence proceeds to step 487 in FIG. 4(e), and the incoming call may then be forwarded.

Although the present invention and its advantages have been described in detail, it should be understood that various changes, substitutions and alterations can be made herein without departing from the spirit and scope of the invention as defined by the appended claims.

What is claimed is:

1. A method of automatically locating a person or object in response to a telephone inquiry by a caller over a telephone system, comprising the steps of:

tracking, based on signal received from transmitters attached to a plurality of persons or objects to be monitored, the locations of the persons or objects within at least a defined area using a network of electronic sensors;

storing current location data in a database;

retrieving requested location data of a person or object in response to the inquiry; and providing said requested location data over the telephone system to the caller.

2. The method of claim 1, wherein said step of tracking is accomplished using an optical sensor network.

3. The method of claim 1, further comprising the steps of:

selecting the identity of a telephone according to a predetermined protocol based upon the retrieved requested location data;

connecting the caller's telephone automatically to said selected telephone; and if said selected telephone is unanswered, proceeding to the step of providing said requested location data to the caller.

4. A system for automatically locating a person or object in response to a telephone inquiry by a caller over a telephone system, comprising:

at least one transmitter attached to a person or object whose movement is to be monitored at least within a defined area, said transmitter operable to transmit a signal including unique identification information associated with said person or object;

a plurality of receivers operable to receive said transmitted signal, each receiver of said plurality of receivers positioned at a respective predetermined location within said defined area;

first circuit operable to store said received identification information and respective location data of each said receiver;

second circuit associated with said first circuitry and operable to update the location data stored with said first circuitry in response to the movement of said person or object; and third circuit operable to provide a message over the telephone system to the caller wherein the message content gives the location of said person or object from a plurality of locations in response to a determination of said updated location.

5. The system of claim 4, wherein said at least one transmitter comprises an optical transmitter.

6. The system of claim 4, wherein said first and second circuit are included in a computer processor.

* * * * *